United States Patent
Minowa et al.

(10) Patent No.: US 10,883,837 B2
(45) Date of Patent: Jan. 5, 2021

(54) MAP GENERATING SERVER AND MAP GENERATING METHOD

(71) Applicant: Honda Motor Co., Ltd., Tokyo (JP)

(72) Inventors: Satoru Minowa, Tokyo (JP); Shigenori Hiruta, Wako (JP); Kimiyoshi Kusaka, Wako (JP); Shiro Kitamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 16/179,487

(22) Filed: Nov. 2, 2018

(65) Prior Publication Data

US 2019/0137282 A1    May 9, 2019

(30) Foreign Application Priority Data

Nov. 8, 2017 (JP) ................. 2017-215753

(51) Int. Cl.
| | |
|---|---|
| *G01C 21/30* | (2006.01) |
| *G01C 21/32* | (2006.01) |
| *G06F 16/29* | (2019.01) |
| *G06F 16/23* | (2019.01) |
| *G08G 1/0968* | (2006.01) |
| *G06F 16/9537* | (2019.01) |

(52) U.S. Cl.
CPC .......... *G01C 21/30* (2013.01); *G01C 21/32* (2013.01); *G06F 16/2379* (2019.01); *G06F 16/29* (2019.01); *G06F 16/9537* (2019.01); *G08G 1/096844* (2013.01); *G08G 1/096872* (2013.01); *G08G 1/096894* (2013.01)

(58) Field of Classification Search
None
See application file for complete search history.

(56) References Cited

U.S. PATENT DOCUMENTS

| | | | | |
|---|---|---|---|---|
| 8,718,910 | B2 * | 5/2014 | Gueziec | G08G 1/0112 701/119 |
| 9,613,468 | B2 * | 4/2017 | Davidson | G06Q 10/0631 |

(Continued)

FOREIGN PATENT DOCUMENTS

| | | |
|---|---|---|
| JP | 2012002782 A | 1/2012 |
| JP | 2013003043 A | 1/2013 |
| JP | 2014181940 A | 9/2014 |

(Continued)

*Primary Examiner* — Todd Melton
(74) *Attorney, Agent, or Firm* — Duft & Bornsen, PC (57) ABSTRACT

A map generating server capable of bidirectional communication with multiple vehicles having a database configured to store vehicle type identifiers assigned to the vehicles and map data regarding roads usable by the vehicles and cultivated land area near the roads. In the server, a vehicle position data tagged with vehicle type identifier is successively written to location concerned of the map data when each vehicle transmits the position data tagged with the vehicle type identifier. The vehicle position data writing number is incremented if the written vehicle position data is that of a vehicle assigned a specified vehicle type identifier, and the location concerned of the cultivated land area is determined to be cultivated land area road and to update the map data stored in the database when the writing number is equal to or greater than a predetermined number.

12 Claims, 4 Drawing Sheets

(56) References Cited

U.S. PATENT DOCUMENTS

2016/0210864 A1 7/2016 Mizutani et al.
2018/0252536 A1* 9/2018 Dorum ............... G01C 21/3673

FOREIGN PATENT DOCUMENTS

| JP | 2015053688 A | 3/2015 |
| JP | 2016133854 A | 7/2016 |
| WO | 2015098280 A1 | 7/2015 |

* cited by examiner

MAP GENERATING SERVER AND MAP GENERATING METHOD

CROSS-REFERENCE TO RELATED APPLICATION

This application is based upon and claims the benefit of priority from Japanese Patent Application No. 2017-215753 filed on Nov. 8, 2017, the contents of which are incorporated herein by reference.

BACKGROUND OF THE INVENTION

Field of the Invention

This invention relates to a map generating server and a map generating method, particularly to a technology for generating a map for a navigating vehicle.

Description of Related Art

WO 2015/098280 A1 proposes a technology for receiving position data from a vehicle and updating a map upon determining that a new road was opened to traffic. Specifically, the technology of the reference is configured to respond to determination of a new road by ascertaining a connected proximal preexisting road and a connected distal preexisting road at opposite ends thereof, and updating a map with the new road defined as of same road type and attributes as the existing roads.

The aforesaid configuration of the technology of the reference simplifies updating, but when a vehicle departs from a preexisting road and thereafter returns to the preexisting road, the route in between is treated as a new road during update. Therefore, even in a case where the vehicle enters a farm service road between paddies or cultivated fields bordering a preexisting road, the farm road is also treated as a new road.

As vehicles that run on paddy and field roads are usually restricted to light (small) trucks, tractors and other farm utility vehicles, ordinary vehicles are apt to be inconvenienced should map data be updated with such roads defined as new routes.

SUMMARY OF THE INVENTION

An object of the present invention is therefore to overcome the aforesaid problem by providing a map generating server and map generating method configured to differentiate new road definition by vehicle type when the vehicle runs in an area comprising of road and nearby cultivated land.

In order to achieve the object, the present invention provides in its first aspect a map generating server capable of bidirectional communication with multiple vehicles, comprising: a database configured to store vehicle type identifiers assigned to the vehicles and map data regarding roads usable by the vehicles and cultivated land area near the roads; a vehicle position data writing unit configured to access the database and write a vehicle position data tagged with vehicle type identifier to location concerned of the map data, when each of the vehicles transmits the vehicle position data tagged with the vehicle type identifier assigned to the vehicle; a position data write number counting unit configured to increment a vehicle position data writing number if the written vehicle position data is the vehicle position data of a vehicle assigned a specified vehicle type identifier, when the vehicle position data is written to the location concerned of the cultivated land area of the map data by the vehicle position data writing unit; and a map data updating unit configured to determine the location concerned of the cultivated land area to be cultivated land area road and to update the map data stored in the database when the vehicle position data writing number is equal to or greater than a predetermined number.

In order to achieve the object, the present invention provides in its second aspect a map generating server capable of bidirectional communication with multiple vehicles, comprising: a database configured to store vehicle type identifiers assigned to the vehicles and map data regarding roads usable by the vehicles and cultivated land area near the roads; and at least one processor and a memory coupled to the processor; wherein the processor is configured to perform: accessing the database and writing a vehicle position data tagged with vehicle type identifier to location concerned of the map data, when each of the vehicles transmits the vehicle position data tagged with the vehicle type identifier assigned to the vehicle; incrementing a vehicle position data writing number if the written vehicle position data is the vehicle position data of a vehicle assigned a specified vehicle type identifier, when the vehicle position data is written to the location concerned of the cultivated land area of the map data; and determining the location concerned of the cultivated land area to be cultivated land area road and updating the map data stored in the database when the vehicle position data writing number is equal to or greater than a predetermined number.

In order to achieve the object, the present invention provides in its third aspect a map generating method for generating map data regarding roads usable by multiple vehicles and cultivated land area near the roads, comprising the steps of: writing vehicle position data tagged with vehicle type identifier to location concerned of the map data, when each of the vehicles transmits the vehicle position data tagged with the vehicle type identifier assigned to the vehicle; incrementing a vehicle position data writing number if the written vehicle position data is the position data of a vehicle assigned a specified vehicle type identifier, when the vehicle position data is written to the location concerned of the cultivated land area of the map data by the step of vehicle position data writing; and determining the location concerned of the cultivated land area to be cultivated land area road and updating the map data when the vehicle position data writing number is equal to or greater than a predetermined number.

DETAILED DESCRIPTION OF THE INVENTION

An embodiment of the map generating server and map generating method according to the present invention is explained with reference to the attached drawings in the following.

Figure 1:
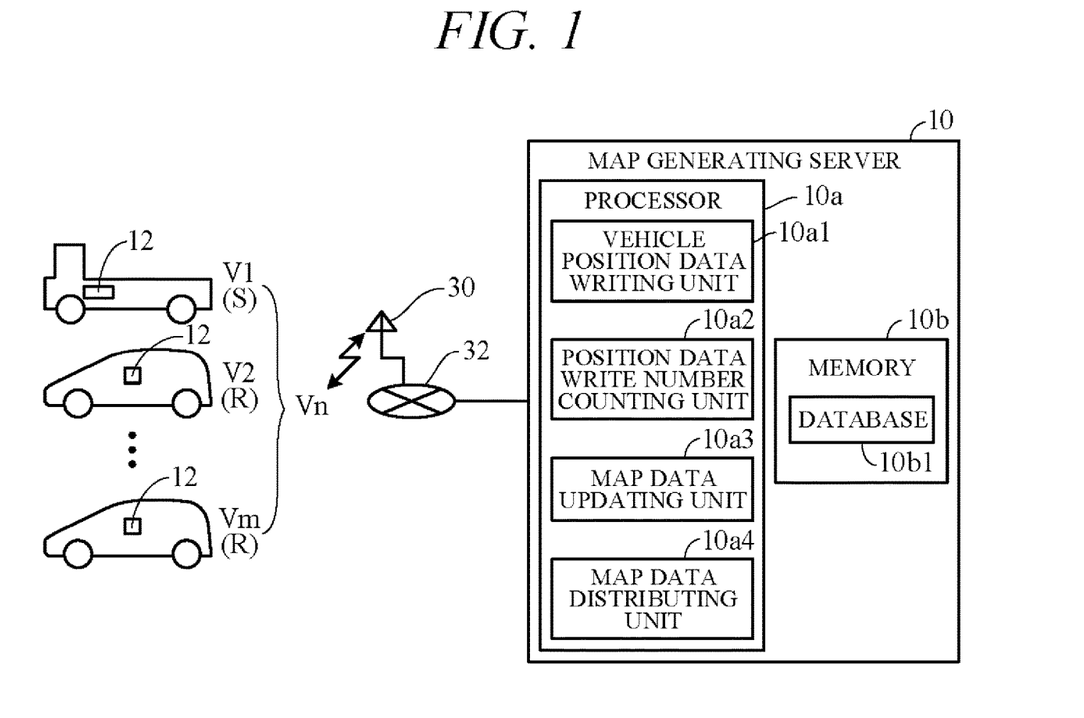
FIG. 1 is a schematic diagram generally illustrating a map generating server according to the present invention.
Figure 2:
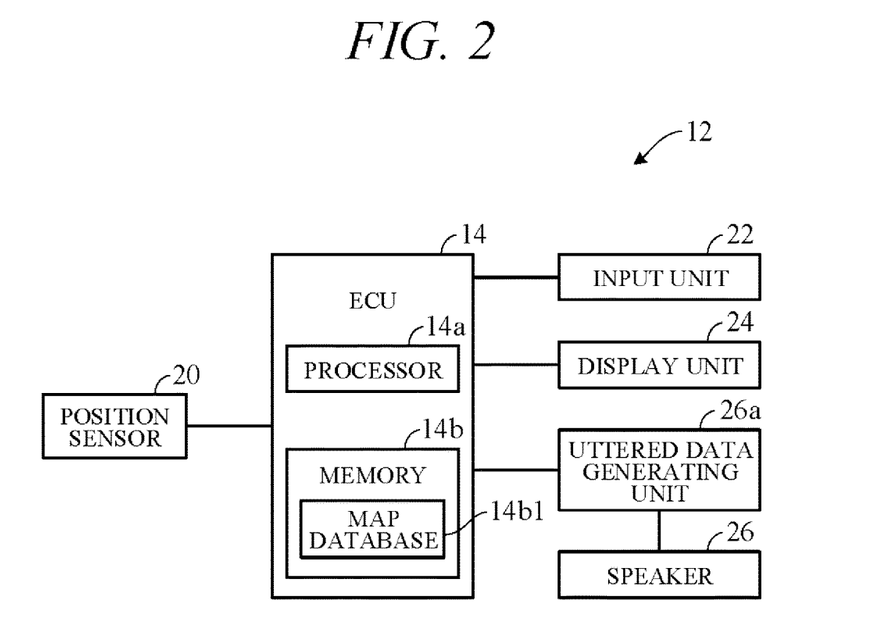
FIG. 2 is a schematic diagram illustrating configuration of a communication-type navigation system mounted in a vehicle of FIG. 1.

FIG. 1 is a schematic diagram generally illustrating a map generating server according to the present invention, and FIG. 2 is a schematic diagram illustrating configuration of a communication-type navigation system mounted in a vehicle of FIG. 1.

Reference numeral 10 in FIG. 1 designates a map generating server according to the embodiment of the present invention. The map generating server 10 is configured as a computer. The server 10 can be installed in a facility owned by Applicant or configured as a cloud server. The map generating server 10 is equipped with at least a single or multiple processors (CPUs) 10a and memory 10b coupled to the processor and including ROM, RAM and the like.

The map generating server 10 is adapted for bidirectional communication with multiple vehicles Vn. "Vehicles Vn" is used here as a collective term for multiple vehicles V1 to Vm (m≥2) of various types. The vehicles Vn are each equipped with a communication-type navigation system (hereinafter called navigation system) 12. Although in the present embodiment the navigation system 12 is described as an apparatus installed in the vehicles Vn, it is not limited to an apparatus and can instead be, for example, a smartphone or other mobile communication terminal installed with navigation software.

The navigation system 12 is equipped with an electronic control unit (ECU) 14. The ECU 14 comprises a processor (CPU) 14a and ROM, RAM and other memory 14b coupled to the processor 14a, and the memory 14b stores a map database (D/B) 14b1 containing map data required for navigation.

A position sensor 20, input unit 22, display unit 24 and speaker 26 all mounted on the associated vehicle Vn are connected to the ECU 14. The position sensor 20 comprises, inter alia, a Global Positioning System receiver for receiving signals from GPS satellites and autonomous navigation sensors for ascertaining vehicle advance direction of the associated vehicle Vn by autonomous navigation. The position sensor 20 outputs a signal indicating current position of the associated vehicle Vn.

The input unit 22 is equipment by which passengers, including driver, input destination and various other instructions, and includes, for example, a touch panel, input keys and the like. The display unit 24 comprises a liquid-crystal display or touch panel and displays target route and related information when a passenger inputs a destination.

The speaker 26, which is used to voice-output various information, is connected to an uttered data generating circuit 26a that is in turn connected to the ECU 14. The uttered data generating circuit 26a generates uttered data in response to instructions from the ECU 14 and voice-outputs the generated data to passengers through the speaker 26.

The map generating server 10 and the individual vehicles Vn (more specifically, the navigation systems 12 installed in the vehicles Vn) are interconnected to enable bidirectional communication through antennas or other receiving means 30 and a public telephone communication network (or wireless LAN) 32. Each vehicle Vn periodically transmits subject vehicle position data measured by the position sensor 20 of the navigation system 12 and tagged with a vehicle type identifier assigned to the subject vehicle (and a vehicle-specific code number that is able to specify each vehicle) to the map generating server 10.

So when the vehicle Vn is running, its own vehicle position data are transmitted through a communication module and a probe collection module (neither shown) incorporated in the navigation system 12 to the map generating server 10 as probe data (floating car data).

Moreover, the map generating server 10 is responsive to requests from individual drivers of the vehicles Vn for sending them position and other running condition data of the vehicles Vn, and further, as explained later, distributes updated cultivated land area map data to only some of the vehicles Vn.

The "vehicle type identifier is a code for differentiating the vehicles Vn by which of two types they belong to, namely, type S comprising of farm utility vehicles such as light trucks and tractors allowed to run on public roads (designated vehicle type identifier) and type R comprising of all vehicles other than S type vehicles, i.e., ordinary vehicles. Of the vehicles shown in FIG. 1, vehicle V1 is assigned type identifier S and vehicles V2 to Vm are assigned type identifier R. Each vehicle Vn also transmits a vehicle-specific code number along with the vehicle type identifier.

In Japan, a light truck is defined as one that meets the light automobile standards of engine displacement of not greater than 660 cc, total length of not greater than 3.4 m and total width of not greater than 1.4 m and whose bed is within stipulated dimensions. The truck bed is for carrying agricultural equipment, fertilizer, harvested crops and the like.

As illustrated, the processor 10a of the map generating server 10 includes a vehicle position data writing unit 10a1, a position data write number counting unit 10a2, a map data updating unit 10a3 and a map data distributing unit 10a4, and the memory 10b includes a database 10b1. In other words, the vehicle position data writing unit 10a1 and so on are implemented as functions of the processor 10a.

The database 10b1 stores map data on roads usable by all vehicles Vn and on cultivated land area near such roads.

"Road" as termed herein includes roads pursuant to Article 2.1 of the Japan Road Traffic Law (commonly called public roads), automobile roads pursuant to Article 2.8 of the Japan Road Transportation Act, and other areas used for general traffic (i.e., roads other than public roads and automobile roads that are deemed roads in light of actual use conditions).

The term "cultivated land area near such road" used herein means an area of agricultural land used particularly for cultivation farming (cultivated land) and is defined to include farm service roads used by farm utility vehicles in cultivated land areas. So in this specification a "cultivated land area near such road" means a cultivated land area connected to a public or similar road via a farm service road.

Road data stored in the database 10b1 include data regarding nodes corresponding to crossings, forks and other points where multiple roads intersect, data regarding road links corresponding to roads, traffic lanes and the like, and data regarding type of cultivated land area (agricultural land, pasture land, etc.). Road type data include data regarding road category (expressway, ordinary road, etc.) and data regarding road attributes (number of lanes, road width, traffic regulations and the like).

When the vehicle position data writing unit 10a1 receives subject vehicle position data tagged with a vehicle type identifier S or R (and a vehicle-specific code number) assigned to a subject vehicle among those assigned to the multiple vehicles Vn, it accesses the database 10b1 and saves the position data tagged with the vehicle type identifier to the map data location associated with the road and cultivated land area (location concerned).

The map data are indicated by links within meshes subdividing a region into a grid (e.g., 80-km square first-order meshes, 10-km square second-order meshes and 1-km square third-order meshes), and "location concerned" in this context indicates the links associated with the vehicle position data or a position in the vicinity thereof.

When position data are written to location (area) concerned of the cultivated land area map data by the vehicle position data writing unit 10a1, the position data write number counting unit 10a2 increments the position data write number by one provided that the written position data at that location are position data of the vehicle assigned the specified vehicle type identifier (namely, S).

When the write number counted by the position data write number counting unit 10a2 reaches or exceeds a predetermined number, the map data updating unit 10a3 determines the location (area) concerned of the cultivated land area to be a cultivated land area road and updates map data stored in the database 10b1 accordingly.

The map data distributing unit 10a4 distributes map data stored in the database 10b1 to the vehicles. More specifically, the map data distributing unit 10a4 distributes map data including data regarding cultivated land area road determined by the map data updating unit 10a3 to only those vehicles among the vehicles Vn that are assigned the specified vehicle type identifier (type: S).

Figure 3:
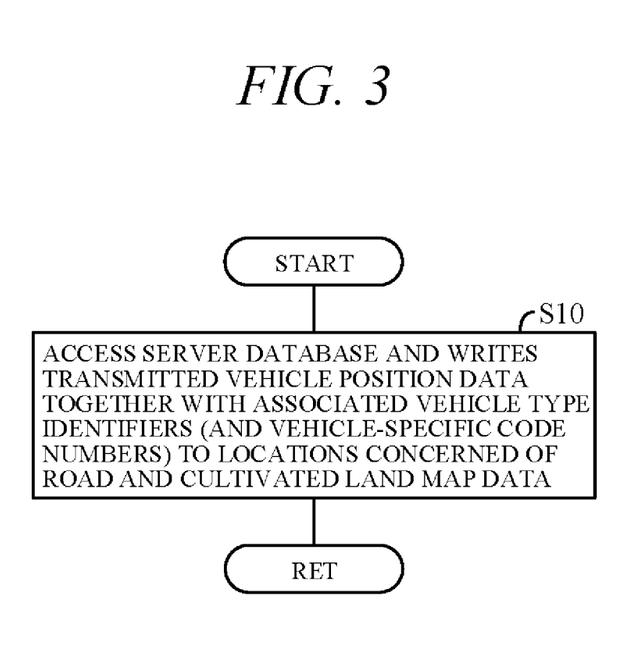
FIG. 3 is a flowchart showing processing of a processor of the map generating server of FIG. 1.

FIG. 3 is a flowchart showing processing of the processor 10a of the map generating server 10 (specifically, its vehicle position data write unit 10a1). The illustrated program is executed at predetermined time intervals.

Once the vehicles Vn have by means of their individual navigation systems 12 transmitted their respective vehicle position data detected by the position sensors 20 and tagged with their assigned vehicle type identifier S or R (and vehicle-specific code number), the vehicle position data writing unit 10a1 in S10 (S: processing Step) accesses the database 10b1 and writes the position data, together with the associated vehicle type identifiers (and vehicle-specific code numbers) to the locations concerned of the road and cultivated land area map data.

Figure 4:
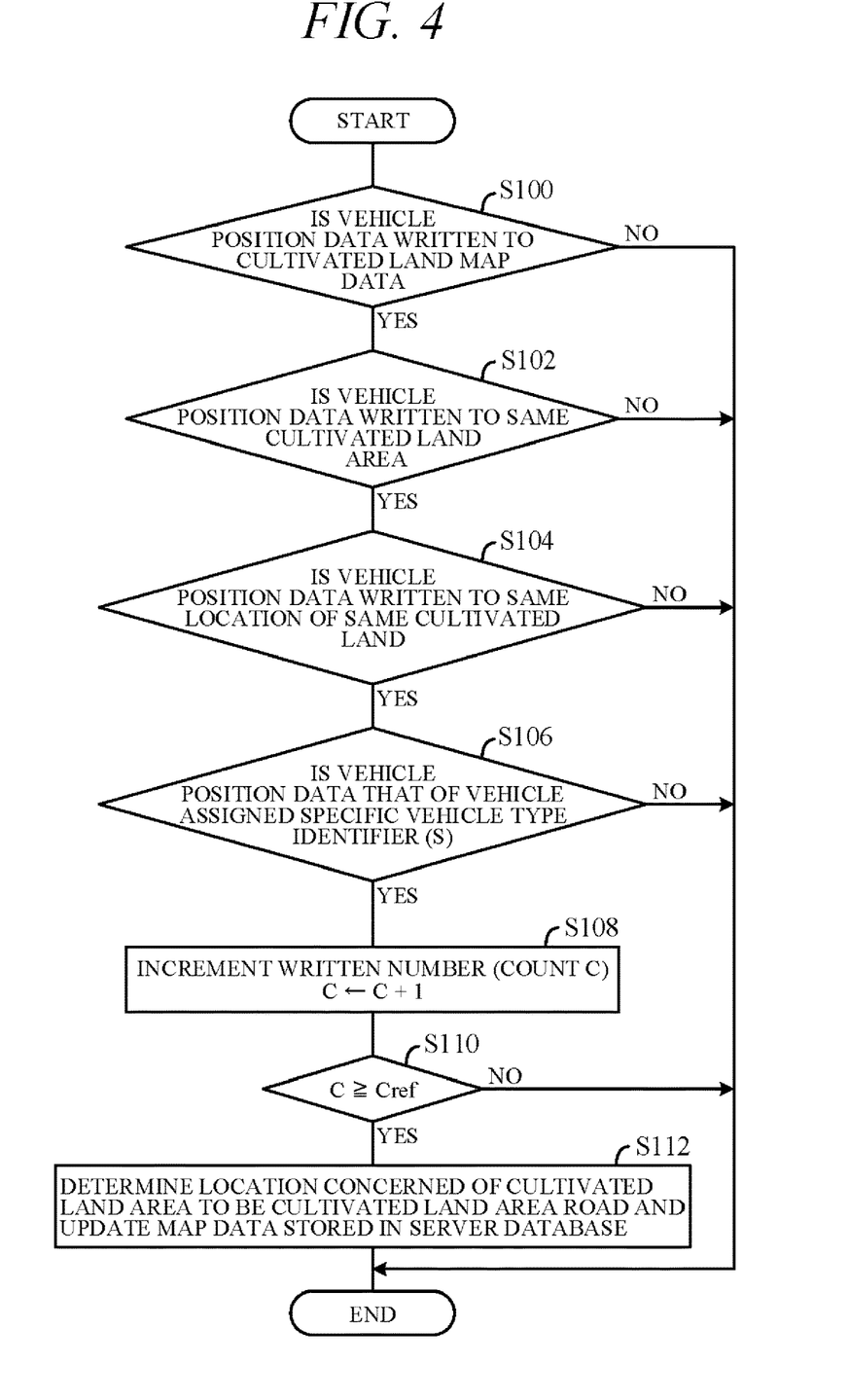
FIG. 4 is a flowchart similarly showing processing of the processor of the map generating server of FIG. 1.

FIG. 4 is a flowchart similarly showing processing of the processor 10a of the map generating server 10 (specifically, its position data write number counting unit 10a2 and map data updating unit 10a3). The illustrated program is executed at predetermined time intervals.

In S100, it is determined whether vehicle position data are written to the cultivated land map data stored in the database 10b1, and when the result is NO, subsequent processing is skipped.

On the other hand, when the result in S100 is YES, the program goes to S102, in which it is determined whether vehicle position data are repeatedly written to a cultivated land area, in other words, whether vehicle position data is written to the same cultivated land area in a preceding cycle of the flowchart of FIG. 4, and when the result is NO, subsequent processing is skipped.

On the other hand, when the result in S102 is YES, the program goes to S104, in which it is determined whether the same location (area) of the same cultivated land is written to, and when the result is NO, subsequent processing is skipped. However, when YES in S104, the program goes to S106, in which is determined whether the written vehicle position data is that of the vehicle assigned the specified vehicle type identifier S.

When the result in S106 is NO, subsequent processing is skipped, and when YES, the program goes to S108, in which the write number (count) C is incremented by one, and to S110, in which it is determined whether the write number (count) C is equal to or greater than a predetermined value Cref.

When the result in S110 is NO, subsequent processing is skipped, and when YES, the program goes to S112, in which the location concerned of the cultivated land area is determined to be a cultivated land area road and map data stored in the database 10b1 is updated accordingly.

Although not indicated in the drawings, the map data update unit 10a3 is configured to enhance reliability of map data stored in the database 10b1 by taking an additional factor into consideration when determining in response to the write number counted by the position data write number counting unit 10a2 reaching or exceeding the predetermined value that location concerned of cultivated land area is cultivated land area road.

The additional factor is, to be specific, speed (vehicle speed) of vehicles assigned vehicle type identifier S. As most cultivated land area roads are narrow an unpaved, vehicles must run at low speed. Therefore, location concerned of cultivated land area is determined to be cultivated land area road on condition of the write number counted by the position data write number counting unit 10a2 reaching or exceeding the predetermined value and of speed of the vehicles assigned vehicle type identifier S being equal to or less than a predetermined speed (e.g., 40 km/h). This further upgrades reliability of the map data.

Figure 5:
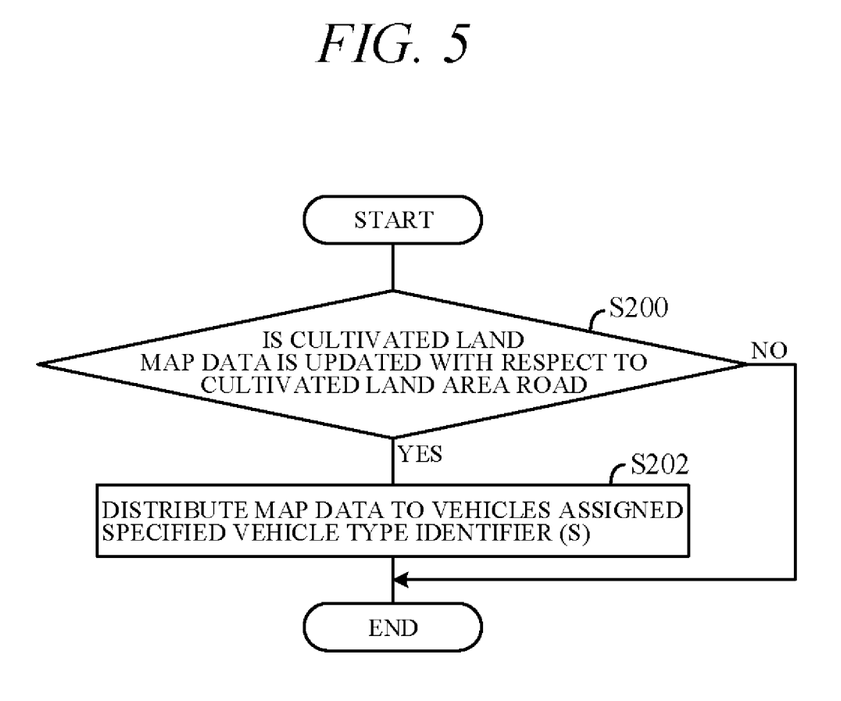
FIG. 5 is a flowchart similarly showing processing of the processor of the map generating server of FIG. 1.

FIG. 5 is a flowchart showing processing of the processor 10a of the map generating server 10 (specifically, its map data distributing unit 10a4). The illustrated program is executed at predetermined time intervals.

In S200, it is determined whether cultivated land of map data stored in the memory 10b is updated with respect to cultivated land area road. When the result is NO, subsequent processing is skipped, but when YES, the program goes to S202, in which map data including data regarding cultivated land area road are distributed to only those vehicles among the vehicles Vn that are assigned the specified vehicle type identifier (S), namely, to the farm utility vehicles including the light trucks.

As set out above, this embodiment is configured to have a map generating server (10) capable of bidirectional communication with multiple vehicles (Vn), comprising: a database (10b1) configured to store vehicle type identifiers (S and R) assigned to the vehicles and map data regarding roads usable by the vehicles and cultivated land area near the roads; a vehicle position data writing unit (10a1) configured to access the database and write a vehicle position data tagged with vehicle type identifier to location concerned of the map data, when each of the vehicles transmits the vehicle position data tagged with the vehicle type identifier assigned to the vehicle; a position data write number counting unit (10a2) configured to increment a vehicle position data writing number (C) if the written vehicle position data is the vehicle position data of a vehicle assigned a specified vehicle type identifier, when the vehicle position data is written to the location concerned of the cultivated land area of the map data by the vehicle position data writing unit; and a map data updating unit (10a3) configured to determine the location concerned of the cultivated land area to be cultivated land area road and to update the map data stored in the database (10b1) when the vehicle position data writing number (C) is equal to or greater than a predetermined number (Cref).

With this, as regards running of vehicles Vn in an area comprising of road and nearby cultivated land, determination regarding new road is differentiated based on the vehicle type so that ordinary vehicles are not inconvenienced even if the map data are updated defining such places as new road.

The server further includes: a map data distributing unit (10a4) configured to distribute the map data including the cultivated land area road determined by the map data updating unit to only those vehicles among the vehicles that are assigned the specified vehicle type identifier. With this, situations that cause inconvenience to ordinary vehicles can be certainly avoided In the server, the vehicles assigned the specified vehicle type identifier are limited to farm utility vehicles including at least light trucks and/or tractors allowed to run on public roads. With this, occurrence of situations that inconvenience ordinary vehicles is still more positively prevented.

In the server, the map data updating unit (10a3) determines the location concerned of cultivated land area to be cultivated land area road and updates the map data stored in the database (10b1) when the position data writing number (C) is equal to or greater than the predetermined number (Cref), and when a speed of the vehicle assigned specified vehicle type identifier is equal to or less than a predetermined speed (S110 to S112). With this, when the vehicles run in an area comprising of road and nearby cultivated land, determination regarding new road is differentiated based on the vehicle type and inconvenience to an ordinary vehicle is therefore still more positively avoided even if map data are updated defining such a places as new road.

Moreover, this embodiment is configured to have a map generating server (10) capable of bidirectional communication with multiple vehicles (Vn), comprising: a database (10b1) configured to store vehicle type identifiers (S and R) assigned to the vehicles and map data regarding roads usable by the vehicles and cultivated land area near the roads; and at least one processor (10a) and a memory (10b) coupled to the processor; wherein the processor (10a) is configured to perform: accessing the database and writing a vehicle position data tagged with vehicle type identifier to location concerned of the map data, when each of the vehicles transmits the vehicle position data tagged with the vehicle type identifier assigned to the vehicle (S10); incrementing a vehicle position data writing number if the written vehicle position data is the vehicle position data of a vehicle assigned a specified vehicle type identifier, when the vehicle position data is written to the location concerned of the cultivated land area of the map data (S100-S108); and determining the location concerned of the cultivated land area to be cultivated land area road and updating the map data stored in the database when the vehicle position data writing number is equal to or greater than a predetermined number (S110-S112). With this, as regards running of vehicles Vn in an area comprising of road and nearby cultivated land, determination regarding new road is differentiated based on the vehicle type so that ordinary vehicles are not inconvenienced even if the map data are updated defining such places as new road.

In the server, the processor (10a) is configured to perform: distributing the map data including the cultivated land area road to only those vehicles among the vehicles that are assigned the specified vehicle type identifier (S200-S202). With this, situations that cause inconvenience to ordinary vehicles can be certainly avoided.

In the server, the vehicles assigned the specified vehicle type identifier are limited to farm utility vehicles including at least light trucks and/or tractors allowed to run on public roads. With this, occurrence of situations that inconvenience ordinary vehicles is still more positively prevented.

In the server, the processor (10a) is configured to perform determining the location concerned of cultivated land area to be cultivated land area road and updating the map data stored in the database when the position data writing number is equal to or greater than the predetermined number, and when a speed of the vehicle assigned specified vehicle type identifier is equal to or less than a predetermined speed (S110-S112). With this, inconvenience to an ordinary vehicle is therefore still more positively avoided even if map data are updated defining such a places as new road.

Moreover, this embodiment is configured to have a map generating method for generating map data regarding roads usable by multiple vehicles and cultivated land area near the roads, comprising the steps of: writing vehicle position data tagged with vehicle type identifier to location concerned of the map data, when each of the vehicles transmits the vehicle position data tagged with the vehicle type identifier assigned to the vehicle (S10); incrementing a vehicle position data writing number (C) if the written vehicle position data is the position data of a vehicle assigned a specified vehicle type identifier, when the vehicle position data is written to the location concerned of the cultivated land area of the map data by the step of vehicle position data writing (S100-S108); and determining the location concerned of the cultivated land area to be cultivated land area road and updating the map data when the vehicle position data writing number (C) is equal to or greater than a predetermined number (Cref) (S110-S112).

With this, as regards running of vehicles Vn in an area comprising of road and nearby cultivated land, determination regarding new road is differentiated based on the vehicle type so that ordinary vehicles are not inconvenienced even if the map data are updated defining such places as new road.

The method further includes the step of: distributing the map data including the cultivated land area road determined by the step of map data updating to only those vehicles among the vehicles that are assigned the specified vehicle type identifier (S200-S202). With this, situations that cause inconvenience to ordinary vehicles can be certainly avoided In the method, the vehicles assigned the specified vehicle type identifier are limited to farm utility vehicles including at least light trucks and/or tractors allowed to run on public roads. With this, occurrence of situations that inconvenience ordinary vehicles is still more positively prevented.

In the method, the step of map data updating determines the location concerned of cultivated land area to be cultivated land area road and updates the map data when the position data writing number (C) is equal to or greater than the predetermined number (Cref), and when a speed of the vehicle assigned specified vehicle type identifier is equal to or less than a predetermined speed (S110 to S112). With this, when the vehicles run in an area comprising of road and nearby cultivated land, determination regarding new road is differentiated based on the vehicle type and inconvenience to an ordinary vehicle is therefore still more positively avoided even if map data are updated defining such a places as new road.

Although the present embodiment adopts a configuration that distributes map data to the navigation systems 12 mounted in the vehicles Vn, use of the map data distributed to the vehicles Vn is not limited to the aforesaid and can optionally be extended to autonomous driving. In such case, farm utility vehicles can run autonomously on both public roads and farm service roads, and other ordinary vehicles can be prevented from inadvertently entering farm service roads when self-driving.

While the present invention has been described with reference to the preferred embodiments thereof, it will be understood, by those skilled in the art, that various changes and modifications may be made without departing from the scope of the appended claims.

What is claimed is:

1. A map generating server capable of bidirectional communication with multiple vehicles, comprising:
   a database configured to store vehicle type identifiers assigned to the vehicles and map data regarding roads usable by the vehicles and a cultivated land area near the roads;
   a vehicle position data writing unit configured to access the database and write vehicle position data tagged with a vehicle type identifier to a location concerned of the map data, when each of the vehicles transmits the vehicle position data tagged with the vehicle type identifier assigned to the vehicle;
   a position data write number counting unit configured to increment a vehicle position data writing number if the written vehicle position data is the vehicle position data of a vehicle assigned a specified vehicle type identifier, when the vehicle position data is written to the location concerned of the cultivated land area of the map data by the vehicle position data writing unit; and
   a map data updating unit configured to determine the location concerned of the cultivated land area to be a cultivated land area road and to update the map data stored in the database when the vehicle position data writing number is equal to or greater than a predetermined number.

2. The map generating server according to claim 1, further including:
   a map data distributing unit configured to distribute the map data including the cultivated land area road determined by the map data updating unit to only those vehicles among the vehicles that are assigned the specified vehicle type identifier.

3. The map generating server according to claim 1, wherein the vehicles assigned the specified vehicle type identifier are limited to farm utility vehicles including at least light trucks and/or tractors allowed to run on public roads.

4. The map generating server according to claim 1, wherein the map data updating unit determines the location concerned of the cultivated land area to be the cultivated land area road and updates the map data stored in the database when the vehicle position data writing number is equal to or greater than the predetermined number, and when a speed of the vehicle the assigned specified vehicle type identifier is equal to or less than a predetermined speed.

5. A map generating server capable of bidirectional communication with multiple vehicles, comprising:
   a database configured to store vehicle type identifiers assigned to the vehicles and map data regarding roads usable by the vehicles and a cultivated land area near the roads; and
   at least one processor and a memory coupled to the processor;
   wherein the processor is configured to perform:
   accessing the database and writing vehicle position data tagged with a vehicle type identifier to a location concerned of the map data, when each of the vehicles transmits the vehicle position data tagged with the vehicle type identifier assigned to the vehicle;
   incrementing a vehicle position data writing number if the written vehicle position data is the vehicle position data of a vehicle assigned a specified vehicle type identifier, when the vehicle position data is written to the location concerned of the cultivated land area of the map data; and
   determining the location concerned of the cultivated land area to be a cultivated land area road and updating the map data stored in the database when the vehicle position data writing number is equal to or greater than a predetermined number.

6. The map generating server according to claim 5, wherein the processor is configured to perform:
   distributing the map data including the cultivated land area road to only those vehicles among the vehicles that are assigned the specified vehicle type identifier.

7. The map generating server according to claim 5, wherein the vehicles assigned the specified vehicle type identifier are limited to farm utility vehicles including at least light trucks and/or tractors allowed to run on public roads.

8. The map generating server according to claim 5, wherein the processor is configured to perform determining the location concerned of the cultivated land area to be the cultivated land area road and updating the map data stored in the database when the vehicle position data writing number is equal to or greater than the predetermined number, and when a speed of the vehicle assigned the specified vehicle type identifier is equal to or less than a predetermined speed.

9. A map generating method for generating map data regarding roads usable by multiple vehicles and a cultivated land area near the roads, comprising the steps of:
   writing vehicle position data tagged with a vehicle type identifier to a location concerned of the map data, when each of the vehicles transmits the vehicle position data tagged with the vehicle type identifier assigned to the vehicle;
   incrementing a vehicle position data writing number if the written vehicle position data is the vehicle position data of a vehicle assigned a specified vehicle type identifier, when the vehicle position data is written to the location concerned of the cultivated land area of the map data by the step of vehicle position data writing; and
   determining the location concerned of the cultivated land area to be a cultivated land area road and updating the map data when the vehicle position data writing number is equal to or greater than a predetermined number.

10. The map generating method according to claim 9, further including the step of:
    distributing the map data including the cultivated land area road determined by the step of map data updating to only those vehicles among the vehicles that are assigned the specified vehicle type identifier.

11. The map generating method according to claim 9, wherein the vehicles assigned the specified vehicle type identifier are limited to farm utility vehicles including at least light trucks and/or tractors allowed to run on public roads.

12. The map generating method according to claim 9, wherein the step of map data updating determines the location concerned of the cultivated land area to be the cultivated land area road and updates the map data when the vehicle position data writing number is equal to or greater than the predetermined number, and when a speed of the vehicle assigned the specified vehicle type identifier is equal to or less than a predetermined speed.

* * * * *